United States Patent
Fumoto et al.

(10) Patent No.: US 11,397,052 B2
(45) Date of Patent: Jul. 26, 2022

(54) HEAT EXCHANGER (71) Applicant: NGK INSULATORS, LTD., Nagoya (JP)

(72) Inventors: Yutaro Fumoto, Kasugai (JP); Tatsuo Kawaguchi, Mizuho (JP)

(73) Assignee: NGK Insulators, Ltd., Nagoya (JP)

( * ) Notice: Subject to any disclaimer, the term of this patent is extended or adjusted under 35 U.S.C. 154(b) by 236 days.

(21) Appl. No.: 16/895,167

(22) Filed: Jun. 8, 2020

(65) Prior Publication Data

US 2021/0080184 A1  Mar. 18, 2021

(30) Foreign Application Priority Data

Sep. 12, 2019 (JP) .............................. JP2019-166658

(51) Int. Cl.
 *F28D 7/10* (2006.01)
 *F28D 7/16* (2006.01)
 *F28F 21/04* (2006.01)
 *F28F 19/01* (2006.01)
 *F28F 1/40* (2006.01)

(52) U.S. Cl.
 CPC ............. *F28D 7/10* (2013.01); *F28D 7/1676* (2013.01); *F28F 1/40* (2013.01); *F28F 19/01* (2013.01); *F28F 21/04* (2013.01)

(58) Field of Classification Search
 CPC .. F01N 3/02; F28D 7/10; F28D 7/1676; F28F 1/40; F28F 19/01; F28F 21/04
 See application file for complete search history.

(56) References Cited

U.S. PATENT DOCUMENTS

| 8,327,634 | B2 * | 12/2012 | Orihashi | .................. | F01N 5/02 |
| | | | | | 60/275 |
| 8,424,296 | B2 * | 4/2013 | Burgers | ................ | F01N 3/2889 |
| | | | | | 60/299 |

(Continued)

FOREIGN PATENT DOCUMENTS

| CN | 107002542 A | 8/2017 |
| CN | 108138636 A | 6/2018 |

(Continued)

OTHER PUBLICATIONS

German Office Action (Application No. 10 2020 208 294.4) dated Sep. 23, 2021 (with English translation).

(Continued)

*Primary Examiner* — Devon Russell
(74) *Attorney, Agent, or Firm* — Burr & Brown, PLLC (57) ABSTRACT

A heat exchanger includes: a hollow pillar shaped honeycomb structure; a first cylindrical member fitted to a surface of an outer peripheral wall of the pillar shaped honeycomb structure; a second cylindrical member fitted to a surface of an inner peripheral wall of the pillar shaped honeycomb structure; a cylindrical guide member having a portion, the portion being disposed on a radially inner side of the second cylindrical member with a distance so as to form the flow path for the first fluid;
 an upstream cylindrical member connecting an upstream end of the first cylindrical member to an upstream side of the guide member; and a downstream cylindrical member connected to a downstream end of the first cylindrical member. The guide member includes an inclined portion that inclines to its downstream side.

7 Claims, 3 Drawing Sheets

(56) References Cited

U.S. PATENT DOCUMENTS

| | | | |
|---|---|---|---|
| 10,494,974 B2* | 12/2019 | Kawaguchi | F28F 21/04 |
| 2009/0049832 A1* | 2/2009 | Hase | F01N 5/02 |
| | | | 60/320 |
| 2012/0297754 A1* | 11/2012 | Hisanaga | F01N 5/02 |
| | | | 60/320 |
| 2014/0352286 A1* | 12/2014 | Kato | F28D 21/0003 |
| | | | 60/320 |
| 2017/0268401 A1 | 9/2017 | Okami et al. | |
| 2018/0230884 A1 | 8/2018 | Kawaguchi et al. | |
| 2019/0277570 A1 | 9/2019 | Kawaguchi et al. | |
| 2020/0141299 A1* | 5/2020 | Kawaguchi | H01L 35/32 |

FOREIGN PATENT DOCUMENTS

| | | | |
|---|---|---|---|
| DE | 11 2016 004 829 T5 | 7/2018 | |
| DE | 11 2018 000 203 T5 | 9/2019 | |
| EP | 2 851 548 A1 | 3/2015 | |
| JP | 2006250524 A * | 9/2006 | F28D 21/0003 |
| JP | 2009-144606 A1 | 7/2009 | |
| JP | 2012-037165 A1 | 2/2012 | |
| JP | 2015-037165 A1 | 2/2015 | |
| JP | 2018-119418 A1 | 8/2018 | |
| WO | 2019/026560 A1 | 2/2019 | |

OTHER PUBLICATIONS

Chinese Office Action (Application No. 202010524082.5) dated Dec. 31, 2021 (with English translation).

* cited by examiner

HEAT EXCHANGER

FIELD OF THE INVENTION

The present invention relates to a heat exchanger.

BACKGROUND OF THE INVENTION

Recently, there is a need for improvement of fuel economy of motor vehicles. In particular, a system is expected that worms up a coolant, engine oil and an automatic transmission fluid (ATF: Automatic Transmission Fluid) at an early stage to reduce friction losses, in order to prevent deterioration of fuel economy at the time when an engine is cold, such as when the engine is started. Further, a system is expected that heats an exhaust gas purifying catalyst in order to activate the catalyst at an early stage.

A such a system, for example, there is a heat exchanger. The heat exchanger is a device for performing heat exchange between a first fluid and a second fluid by allowing the first fluid to flow inside and the second fluid to flow outside. In such a heat exchanger, for example, the heat can be effectively utilized by exchanging the heat from the first fluid having a higher temperature (for example, an exhaust gas) to the second fluid having a lower temperature (for example, cooling water).

Patent Literature 1 proposes a heat exchanger including: a heat collecting portion formed as a honeycomb structure having a plurality of cells through which a first fluid (for example, an exhaust gas) can flow; and a casing arranged to cover an outer peripheral surface of the heat collecting portion, through which a second fluid (for example, cooling water) can flow between the heat collecting portion and the casing.

However, the heat exchanger of Patent Document 1 has a structure in which waste heat from the first fluid to the second fluid is constantly collected. Therefore, even if there is no need to collect the waste heat (even if the heat exchange is not needed), the waste heat might be collected. Therefore, the heat exchanger has been required to increase a capacity of a radiator for discharging the collected waste heat even if there has been no need to collect the waste heat.

On the other hand, Patent Literature 2 proposes a heat exchanger (an exhaust heat recovery device) including: an inner pipe for allowing an exhaust gas from an engine to flow to a rear side of a vehicle; an outer pipe disposed on an outer peripheral portion of the inner pipe in an axial direction of the inner pipe, the outer pipe extending to a more rear side of the vehicle than a rear end of the inner pipe; a valve for opening and closing the rear end of the inner pipe; a first restricting portion having an inflow port that opens toward the rear side of the vehicle with respect to an interior of the inner pipe, the first restricting portion allowing the exhaust gas flowing from the interior of the inner pipe through the inflow port to flow toward a front side of the vehicle, and guiding the exhaust gas to a radially outward side of the inner pipe through a hole formed in the inner pipe; a flow path formed between the inner pipe and the outer pipe, the flow path allowing the exhaust gas guided to the radially outward side of the inner pipe through the hole to flow toward the rear side of the vehicle on a radially outward side of the inner pipe; a heat exchange portion disposed radially outside the inner pipe, the heat exchanging portion exchanging heat between the exhaust gas flowing through the flow path and a refrigerant; and a second restricting portion provided on a more downstream side than the heat exchange portion in a flow direction in the flow path.

The heat exchanger of Patent Literature 2 can perform switching between promotion and suppression of heat recovery (heat exchange) by opening and closing the valve. In particular, the heat exchanger is provided with the first restricting portion and the second restricting portion, so that heat insulation performance can be improved as a result of difficulty for the exhaust gas to flow in the heat exchanger portion by opening the rear end of the inner pipe (opening the valve) during the suppression of heat recovery.

CITATION LIST

Patent Literatures

[Patent Literature 1] Japanese Patent Application Publication No. 2012-037165 A

[Patent Literature 2] Japanese Patent Application Publication No. 2018-119418 A

SUMMARY OF THE INVENTION

The present invention relates to a heat exchanger, comprising:

a hollow pillar shaped honeycomb structure having an inner peripheral wall, an outer peripheral wall and partition walls each disposed between the inner peripheral wall and the outer peripheral wall, the partition walls defining a plurality of cells to form flow paths for a first fluid, each of the cells extending from an inflow end face to an outflow end face;

a first cylindrical member fitted to a surface of the outer peripheral wall of the pillar shaped honeycomb structure;

a second cylindrical member fitted to a surface of the inner peripheral wall of the pillar shaped honeycomb structure;

a cylindrical guide member having a portion, the portion being disposed on a radially inner side of the second cylindrical member with a distance so as to form the flow path for the first fluid;

an upstream cylindrical member connecting an upstream end of the first cylindrical member to an upstream side of the guide member; and a downstream cylindrical member connected to a downstream end of the first cylindrical member, wherein the guide member comprises an inclined portion that inclines to its downstream side; and wherein a communication port for directing the first fluid flowing on an inner peripheral side of the guide member to a space between an inner peripheral side of the second cylindrical member and an outer peripheral side of the guide member is provided between a tip of the inclined portion of the guide member and the second cylindrical member or at the inclined portion of the guide member.

DETAILED DESCRIPTION OF THE INVENTION

In the heat exchanger of Patent Literature 2, the pressure is decreased because the exhaust gas flow is separated around the first restricting portion during suppression of heat recovery (when the valve is opened). On the other hand, due to the larger cross-sectional area of the flow path at the rear end of the inner pipe, the flow rate of the gas decreases and the pressure increases around that area. As a result, the pressure around the first restricting portion becomes lower than that around the rear end of the inner pipe, and the pressure difference leads to easy backflow of the exhaust gas from the rear end of the inner pipe to the heat exchanger. It should be noted that the separation of the exhaust gas flow means a phenomenon in which an exhaust gas flow is separated from an object.

The present invention has been made to solve the above problems. An object of the present invention is to provide a heat exchanger capable of suppressing backflow of a first fluid (an exhaust gas) during suppression of heat recovery to improve heat insulation performance.

As results of intensive studies of a structure of a heat exchanger, the present inventors have found that a heat exchanger having a specific structure can solve the above problems, and have completed the present invention.

According to the present invention, it is possible to provide a heat exchanger capable of suppressing backflow of a first fluid (an exhaust gas) during suppression of heat recovery to improve heat insulation performance.

Hereinafter, embodiments of the present invention will be specifically described with reference to the drawings. It is to understand that the present invention is not limited to the following embodiments, and those which appropriately added changes, improvements and the like to the following embodiments based on knowledge of a person skilled in the art without departing from the spirit of the present invention fall within the scope of the present invention.

A heat exchanger according to an embodiment of the present invention includes: a hollow pillar shaped honeycomb structure (which may, hereinafter, be abbreviated as a "pillar shaped honeycomb structure"); a first cylindrical member; a second cylindrical member; a guide member; an upstream cylindrical member; and a downstream cylindrical member. The heat exchanger may further include at least one of an outer cylindrical member and an on-off valve.

Figure 1:
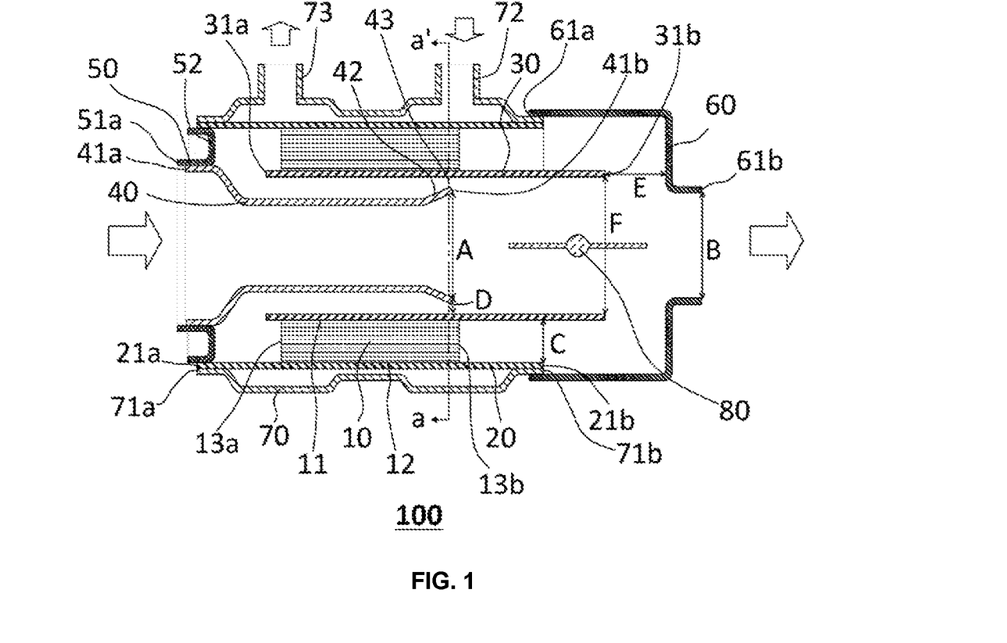
FIG. 1 is a cross-sectional view of a heat exchanger according to an embodiment of the present invention, which is parallel to a flow direction of a first fluid.
Figure 2:
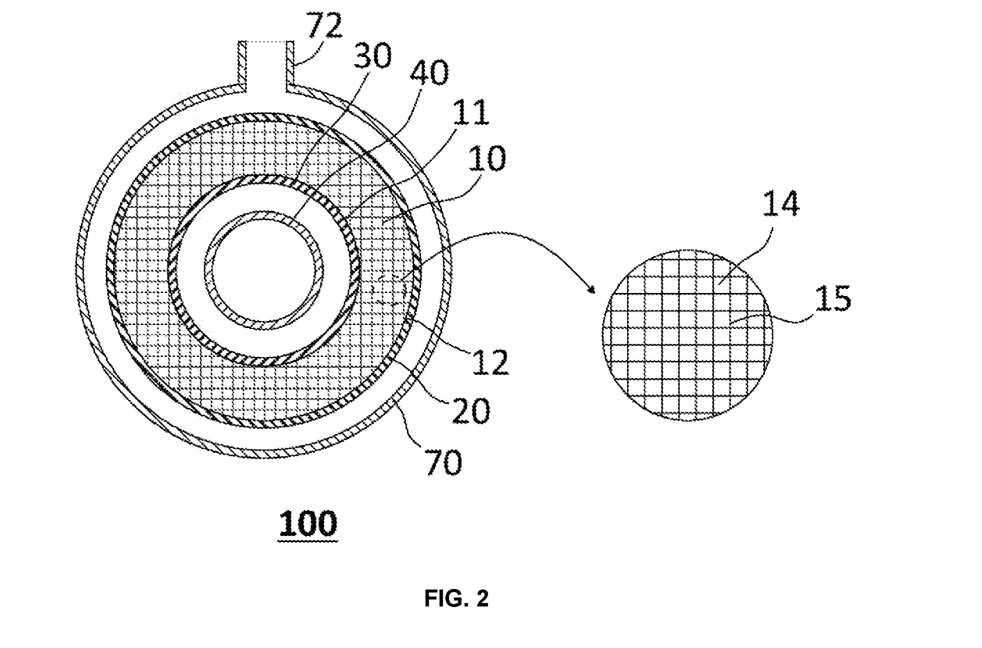
FIG. 2 is a cross-sectional view taken along the line a-a' in the heat exchanger of FIG. 1.

FIG. 1 is a cross-sectional view of a heat exchanger according to an embodiment of the present invention, which is parallel to a flow direction of a first fluid. FIG. 2 is a cross-sectional view taken along the line a-a' in the heat exchanger of FIG. 1.

As shown in FIGS. 1 and 2, a heat exchanger 100 according to an embodiment of the present invention includes: a hollow pillar shaped honeycomb structure 10 (which may, hereinafter be abbreviated as a "pillar shaped honeycomb structure"); a first cylindrical member 20; a second cylindrical member 30; a guide member 40; an upstream cylindrical member 50; a downstream cylindrical member 60; an outer cylindrical member 70; and an on-off valve 80.

<Hollow Pillar Shaped Honeycomb Structure 10>

The hollow pillar shaped honeycomb structure 10 includes: an inner peripheral wall 11; an outer peripheral wall 12; and partition walls 15 disposed between the inner peripheral wall 11 and the outer peripheral wall 12, in which the partition walls 15 define a plurality of cells 14 forming flow paths for a first fluid, and each of the cells extends from an inflow end face 13a to an outflow end face 13b.

As used herein, the "hollow pillar shaped honeycomb structure 10" refers to a pillar shaped honeycomb 10 having a hollow region at a central portion in a cross section of the hollow pillar shaped honeycomb structure 10, which is perpendicular to a flow direction of the first fluid.

A shape (outer shape) of the hollow pillar shaped honeycomb structure 10 is not particularly limited, and it may be, for example, a circular pillar shape, an elliptical pillar shape, a quadrangular pillar shape, or other polygonal pillar shape.

Also, a shape of the hollow region in the hollow pillar shaped honeycomb structure 10 is not particularly limited, and it may be, for example, a circular pillar shape, an elliptical pillar shape, a quadrangular pillar shape, or other polygonal pillar shape.

It should be note that the shape of the hollow pillar shaped honeycomb structure 10 and the shape of the hollow region may be the same as or different from each other. However, they are preferably the same as each other, in terms of resistance to external impact, thermal stress, and the like.

Each of the cells 14 may have any shape, including, but not particularly limited to, circular, elliptical, triangular, quadrangular, hexagonal and other polygonal shapes in a cross section in a direction perpendicular to a flow path direction of the first fluid. Also, the cells 14 are radially provided in a cross section in a direction perpendicular to the flow path direction of the first fluid. Such a structure can allow heat of the first fluid flowing through the cells 14 to be efficiently transmitted to the outside of the hollow pillar shaped honeycomb structure 10.

A thickness of each partition wall 15 is not particularly limited, and it may preferably be from 0.1 to 1 mm, and more preferably from 0.2 to 0.6 mm. The thickness of the partition wall 15 of 0.1 mm or more can provide the hollow pillar shaped honeycomb structure 10 with a sufficient mechanical strength. Further, the thickness of the partition wall 15 of 1 mm or less can prevent problems that the pressure loss is increased due to a decrease in an opening area and the heat recovery efficiency is decreased due to a decrease in a contact area with the first fluid.

Each of the inner peripheral wall 11 and the outer peripheral wall 12 preferably has a thickness larger than that of the partition wall 15, although not particularly limited thereto. Such a structure can lead to increased strength of the inner peripheral wall 11 and the outer peripheral wall 12 which would otherwise tend to generate breakage (e.g., cracking, chinking, and the like) by external impact, thermal stress due to a temperature difference between the first fluid and the second fluid, and the like.

In addition, the thicknesses of the inner peripheral wall 11 and the outer peripheral wall 12 are not particularly limited, and they may be adjusted as needed according to applications and the like. For example, the thickness of each of the inner peripheral wall 11 and the outer peripheral wall 12 is preferably 0.3 mm or more and 10 mm or less, and more preferably from 0.5 mm to 5 mm, and even more preferably from 1 mm to 3 mm, when using the heat exchange 100 for general heat exchange applications. Moreover, when using the heat exchanger 100 for heat storage applications, the thickness of the outer peripheral wall 12 is preferably 10 mm or more, in order to increase a heat capacity of the outer peripheral wall 12.

The partition walls 15, the inner peripheral wall 11 and the outer peripheral wall 12 preferably contain ceramics as a main component. The phrase "contain ceramics as a main component" means that a ratio of a mass of ceramics to a mass of the total component is 50% by mass or more.

Each of the partition walls 15, the inner peripheral wall 11 and the outer peripheral wall 12 preferably has a porosity of 10% or less, and more preferably 5% or less, and even more preferably 3% or less, although not particularly limited thereto. Further, the porosity of the partition walls 15, the inner peripheral wall 11 and the outer peripheral wall 12 may be 0%. The porosity of the partition walls 15, the inner peripheral wall 11 and the outer peripheral wall 12 of 10% or less can lead to improved thermal conductivity.

The partition walls 15, the inner peripheral wall 11 and the outer peripheral wall 12 preferably contain SiC (silicon carbide) having high thermal conductivity as a main component. Examples of such a material includes Si-impregnated SiC, (Si+Al) impregnated SiC, a metal composite SiC, recrystallized SiC, $Si_3N_4$, SiC, and the like. Among them, Si-impregnated SiC and (Si+Al) impregnated SiC are preferably used because they can allow production at lower cost and have high thermal conductivity.

A cell density (that is, the number of cells 14 per unit area) in the cross section of the hollow pillar shaped honeycomb structure 10 perpendicular to the flow path direction of the first fluid is preferably in a range of from 4 to 320 cells/cm$^2$, although not particularly limited thereto. The cell density of 4 cells/cm$^2$ or more can sufficiently ensure the strength of the partition walls 15, hence the strength of the hollow pillar shaped honeycomb structure 10 itself and effective GSA (geometrical surface area). Further, the cell density of 320 cells/cm$^2$ or less can allow prevention of an increase in a pressure loss when the first fluid flows.

The hollow pillar shaped honeycomb structure 10 preferably has an isostatic strength of 100 MPa or more, and more preferably 150 MPa or more, and still more preferably 200 MPa or more, although not particularly limited thereto. The isostatic strength of the hollow pillar shaped honeycomb structure 10 of 100 MPa or more can lead to the hollow pillar shaped honeycomb structure 10 having improved durability. The isostatic strength of the hollow pillar shaped honeycomb structure 10 can be measured according to the method for measuring isostatic fracture strength as defied in the JASO standard M505-87 which is a motor vehicle standard issued by Society of Automotive Engineers of Japan, Inc.

A diameter (an outer diameter) of the outer peripheral wall 12 in the cross section in a direction perpendicular to the flow path direction of the first fluid may preferably be from 20 to 200 mm, and more preferably from 30 to 100 mm, although not particularly limited thereto. Such a diameter can allow improvement of heat recovery efficiency. When the shape of the outer peripheral wall 12 is not circular, the diameter of the largest inscribed circle that is inscribed in the cross-sectional shape of the outer peripheral wall 12 is defined as the diameter of the outer peripheral wall 12.

Further, a diameter of the inner peripheral wall 11 in the cross section in the direction perpendicular to the flow path direction of the first fluid may preferably be from 1 to 50 mm, and more preferably from 2 to 30 mm, although not particularly limited thereto. When the cross-sectional shape of the inner peripheral wall 11 is not circular, the diameter of the largest inscribed circle that is inscribed in the cross-sectional shape of the inner peripheral wall 11 is defined as the diameter of the inner peripheral wall 11.

The hollow pillar shaped honeycomb structure 10 preferably has a thermal conductivity of 50 W/(m·K) or more at 25° C., and more preferably from 100 to 300 W/(m·K), and even more preferably from 120 to 300 W/(m K), although not particularly limited thereto. The thermal conductivity of the hollow pillar shaped honeycomb structure 10 in such a range can lead to an improved thermal conductivity and can allow the heat inside the hollow pillar shaped honeycomb structure 10 to be efficiently transmitted to the outside. It should be noted that the value of thermal conductivity is a value measured according to the laser flash method (JIS R 1611-1997).

In the case where an exhaust gas as the first fluid flows through the cells 14 in the hollow pillar shaped honeycomb structure 10, a catalyst may be supported on the partition walls 15 of the pillar shaped honeycomb structure 10. The supporting of the catalyst on the partition walls 15 can allow CO, NOx, HC and the like in the exhaust gas to be converted into harmless substances through catalytic reaction, and can also allow reaction heat generated during the catalytic reaction to be utilized for heat exchange. Preferable catalysts include those containing at least one element selected from the group consisting of noble metals (platinum, rhodium, palladium, ruthenium, indium, silver and gold), aluminum, nickel, zirconium, titanium, cerium, cobalt, manganese, zinc, copper, tin, iron, niobium, magnesium, lanthanum, samarium, bismuth, and barium. Any of the above-listed elements may be contained as a metal simple substance, a metal oxide, or other metal compound.

A supported amount of the catalyst (catalyst metal+support) may preferably be from 10 to 400 g/L, although not particularly limited thereto. Further, when using the catalyst containing the noble metal(s), the supported amount may preferably be from 0.1 to 5 g/L, although not particularly limited thereto. The supported amount of the catalyst (catalyst metal+support) of 10 g/L or more can easily achieve catalysis. Also, the supported amount of the catalyst (catalyst metal+support) of 400 g/L or less can allow suppression of both an increase in a pressure loss and an increase in a manufacturing cost. The support refers to a carrier on which a catalyst metal is supported. Examples of the supports include those containing at least one selected from the group consisting of alumina, ceria and zirconia.

<First Cylindrical Member 20>

The first cylindrical member 20 is fitted to a surface of the outer peripheral wall 12 of the pillar shaped honeycomb structure 10.

The first cylindrical member 20 is a cylindrical member having an upstream end 21*a* and a downstream end 21*b*.

It is preferable that an axial direction of the first cylindrical member 20 coincides with that of the pillar shaped honeycomb structure 10, and a central axis of the first cylindrical member 20 coincides with that of the pillar shaped honeycomb structure 10. It is also preferable that an axial center position of the first cylindrical member 20 coincides with that of the pillar shaped honeycomb structure 10. Furthermore, diameters (an outer diameter and an inner diameter) of the first cylindrical member 20 may be uniform in the axial direction, but the diameter of at least a part (for example, both ends in the axial direction or the like) of the first cylindrical member 20 may be decreased or increased.

Non-limiting examples of the first cylindrical member 20 that can be used include a cylindrical member that is fitted to the surface of the outer peripheral wall 12 of the hollow pillar shaped honeycomb structure 10 to cover circumferentially the outer peripheral wall 12 of the hollow pillar shaped honeycomb structure 10.

As used herein, the term "fitted" means that the hollow pillar shaped honeycomb structure 10 and the first cylindrical member 20 are fixed in a state of being suited to each other. Therefore, the fitting of the hollow pillar shaped honeycomb structure 10 and the first cylindrical member 20 encompasses cases where the hollow pillar shaped honeycomb structure 10 and the first cylindrical member 20 are fixed to each other by a fixing method based on fitting such as clearance fitting, interference fitting and shrinkage fitting, as well as by brazing, welding, diffusion bonding, or the like.

The first cylindrical member 20 may preferably have an inner surface shape corresponding to the surface of the outer peripheral wall 12 of the hollow pillar shaped honeycomb structure 10. Since the inner surface of the first cylindrical member 20 is in direct contact with the outer peripheral wall 12 of the hollow pillar shaped honeycomb structure 10, the thermal conductivity is improved and the heat in the hollow pillar shaped honeycomb structure 10 can be efficiently transferred to the first cylindrical member 20.

In terms of improvement of the heat recovery efficiency, a higher ratio of an area of a portion circumferentially covered with the first cylindrical member 20 in the outer peripheral wall 12 of the hollow pillar shaped honeycomb structure 10 to the total area of the outer peripheral wall 12 of the hollow pillar shaped honeycomb structure 10 is preferable. Specifically, the area ratio is preferably 80% or more, and more preferably 90% or more, and even more preferably 100% (that is, the entire outer peripheral wall 12 of the hollow pillar shaped honeycomb structure 10 is circumferentially covered with the first cylindrical member 20).

It should be noted that the term "outer peripheral wall 12" as used herein refers to a surface of the pillar shaped honeycomb structure 10, which is parallel to the flow path direction of the first fluid, and it does not indicate surfaces (the inflow end face 13a and the outflow end face 13b) of the pillar shaped honeycomb structure 10, which are perpendicular to the flow path direction of the first fluid.

The first cylindrical member 20 is preferably made of a metal in terms of manufacturability, although not particularly limited thereto. Further, the metallic first cylindrical member 20 is also preferable in that it can be easily welded to an outer cylindrical member 70 or the like, which will be described below. Examples of the material of the first cylindrical member 20 that can be used include stainless steel, titanium alloys, copper alloys, aluminum alloys, brass and the like. Among them, the stainless steel is preferable because it has high durability and reliability and is inexpensive.

The first cylindrical member 20 preferably has a thickness of 0.1 mm or more, and more preferably 0.3 mm or more, and still more preferably 0.5 mm or more, although not particularly limited thereto. The thickness of the first cylindrical member 20 of 0.1 mm or more can allow durability and reliability to be ensured. The thickness of the first cylindrical member 20 is preferably 10 mm or less, and more preferably 5 mm or less, and still more preferably 3 mm or less. The thickness of the first cylindrical member 20 of 10 mm or less can reduce thermal resistance and improve thermal conductivity.

<Second Cylindrical Member 30>

The second cylindrical member 30 is fitted to a surface of the inner peripheral wall of the pillar shaped honeycomb structure 10.

The second cylindrical member 30 is a cylindrical member having an upstream end 31a and a downstream end 31b.

It is preferable that an axial direction of the second cylindrical member 30 coincides with that of the pillar shaped honeycomb structure 10, and a central axis of the second cylindrical member 30 coincides with that of the pillar shaped honeycomb structure 10. It is also preferable that an axial central position of the second cylindrical member 30 coincides with that of the pillar shaped honeycomb structure 10.

A non-limiting example of the second cylindrical member 30 that can be used includes a cylindrical member in which a part of the outer peripheral surface is in contact with the surface of the inner peripheral wall 11 of the hollow pillar shaped honeycomb structure 10.

Here, the part of the outer peripheral surface of the second cylindrical member 30 and the surface of the inner peripheral wall 11 of the pillar shaped honeycomb structure 10 may be in direct contact with each other, or may be in indirect contact with each other via the other member.

The part of the outer peripheral surface of the second cylindrical member 30 and the surface of the inner peripheral wall 11 of the pillar shaped honeycomb structure 10 are fixed in a state of being fitted to each other. The fixing method is not particularly limited, and is the same as the method of fixing the first cylindrical member 20 as discussed above.

A material of the second cylindrical member 30 is not particularly limited, and is the same as the material of the first cylindrical member 20 as discussed above.

A thickness of the second cylindrical member 30 is not particularly limited, and is the same as the thickness of the first cylindrical member 20 as discussed above.

<Guide Member 40>

The guide member 40 has a portion arranged on a radially inner side of the second cylindrical member 30 with a distance so as to form a flow path for the first fluid.

The guide member 40 is a cylindrical member having an upstream end 41a and a downstream end 41b.

It is preferable that an axial direction of the guide member 40 coincides with that of the pillar shaped honeycomb structure 10, and a central axis of the guide member 40 coincides with that of the pillar shaped honeycomb structure 10.

An example of the guide member 40 that can be used includes a cylindrical member having an outer diameter smaller than an inner diameter of the second cylindrical member 30 in a cross section perpendicular to an axial direction of the guide member 40 and the second cylindrical member 30, for example. With such a configuration, the second cylindrical member 30 and the guide member 40 are not in contact with each other, whereby the flow path for the first fluid formed between the second cylindrical member 30 and the guide member 40 can be ensured.

Although not particularly limited, a cross-sectional area between the second cylindrical member 30 and the guide member 40 in the direction perpendicular to the axial direction of the guide member 40 and the second cylindrical member 30 (the direction perpendicular to the axial direction of the flow path for the first fluid) is such that a ratio of the cross-sectional area between the second cylindrical member 30 and the guide member 40 to the cross-sectional area at an upstream end 51a in a direction perpendicular to an axial direction of an upstream cylindrical member 50 as described below is preferably from 0.1 to 3, and more preferably from 0.5 to 2. By controlling the ratio of the cross-sectional areas to such a range, it is possible to suppress an increase in pressure loss during heat recovery.

The guide member 40 has an inclined portion 42 that inclines to the downstream side. The inclined portion 42 corresponds to a portion where diameters (outer diameter and inner diameter) of the guide member 40 are increased toward the downstream side.

A communication port 43 for guiding the first fluid flowing on the inner peripheral surface side of the guide member 40 to a space between the inner peripheral surface side of the second cylindrical member 30 and the outer peripheral surface side of the guide member 40 may be provided between a tip of the inclined portion 42 and the second cylindrical member 30. Such a communication port 43 can be provided by decreasing an outer diameter of the tip of the inclined portion 42 of the guide member 40 as compared with an inner diameter of the second cylindrical member 30.

When the communication port 43 as described above is provided, in the axial direction of the guide member 40 and the second cylindrical member 30, the downstream end 41b of the guide member 30 will be located at the upstream end 31a side than the downstream end 31b of the second cylindrical member 30.

Figure 3:
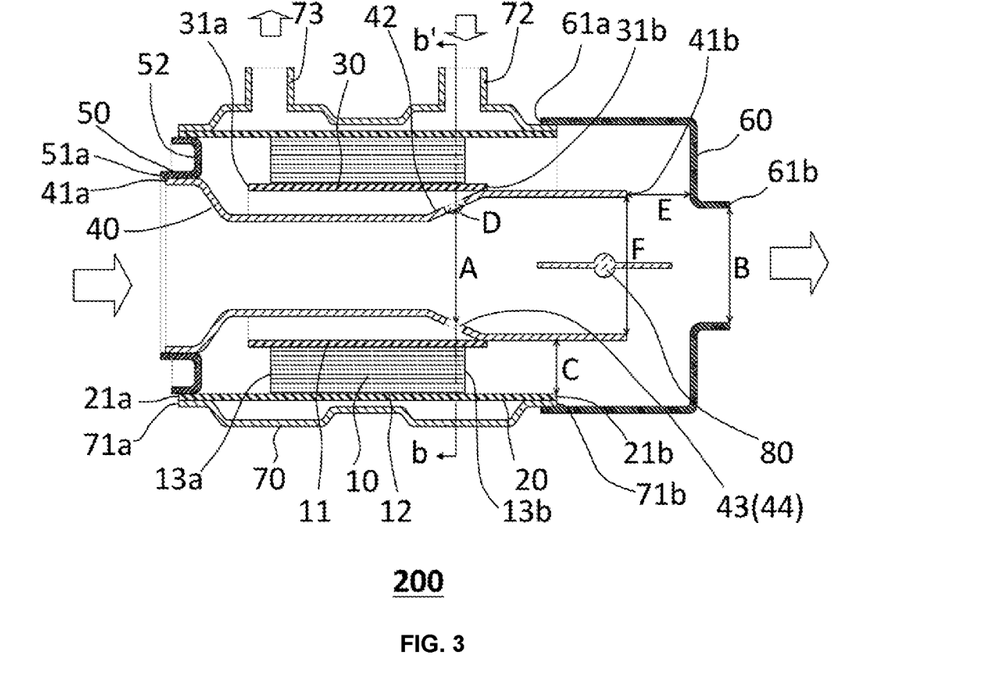
FIG. 3 is a cross-sectional view of the other heat exchanger according to an embodiment of the present invention, which is parallel to a flow direction of a first fluid.
Figure 4:
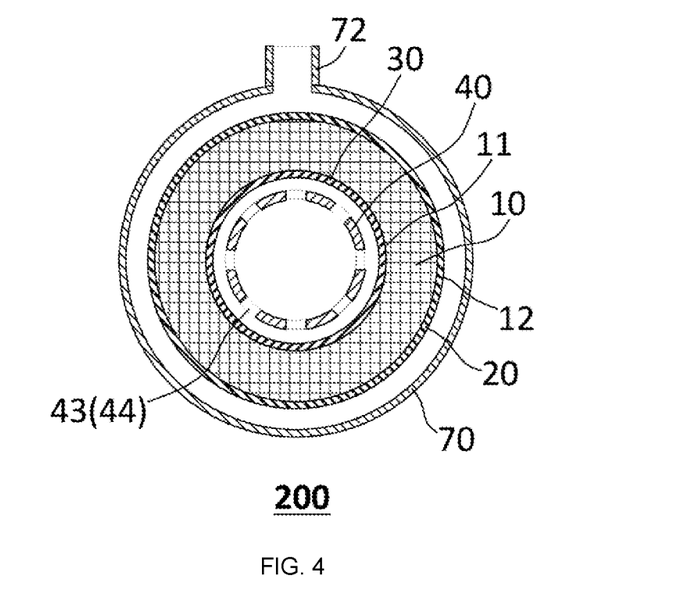
FIG. 4 is a cross-sectional view of the b-b' line in the heat exchanger of FIG. 3.

Alternatively, the communication port 43 may be provided at the inclined portion 42 of the guide member 40 as shown in FIGS. 3 and 4. Here, FIG. 3 is a cross-sectional view of the other heat exchanger according to an embodiment of the present invention, which is parallel to the flow direction of the first fluid. Further, FIG. 4 is a cross-sectional view taken along the line b-b' of the heat exchanger of FIG. 3.

The communication port 43 as described above can be provided by forming at least one through hole 44 penetrating the inclined portion 42 of the guide member 40 in the radial direction of the guide member 40. The through hole 44 is preferably provided in the entire circumferential direction of the guide member 40. Further, a plurality of through holes 44 may be provided in the axial direction of the guide member 40.

When the communication port 43 as described above is provided, in the axial direction of the guide member 40 and the second cylindrical member 30, the downstream end 41b of the guide member 40 may be located on the upstream end 31a side than the downstream end 31b of the second cylindrical member 30, or may extend on a more downstream side than the downstream end 31b. Further, the downstream end 31b of the second cylindrical member 30 may be connected to the guide member 40.

By providing the communication port 43 at the position as described above, it is possible to suppress separation of the flow of the first fluid, which is generated around the communication port 43, so that a pressure difference between the pressures around the communication port 43 and a region after passing through an on-off valve 80. Therefore, during suppression of heat recovery, it is possible to prevent the first fluid that has passed through the on-off valve 80 from flowing back to the pillar shaped honeycomb structure 10 from the downstream side to improve the heat insulation performance.

Further, in the axial direction of the second cylindrical member 30, the communication port 43 is located on the downstream end 31b side than the upstream end 31a. By providing the communication port 43 at such a position, the flow direction of the first fluid toward the pillar shaped honeycomb structure 10 will be opposite to the flow direction of the first fluid on the inner peripheral surface side of the guide member 40. Therefore, during the suppression of heat recovery, it will be difficult for the first fluid to flow in a space between the second cylindrical member 30 and the guide member 40, thereby enabling the heat insulation performance to be improved.

The communication port 43 may extend beyond the outflow end face 13b of the pillar shaped honeycomb structure 10 in the axial direction of the pillar shaped honeycomb structure 10. By providing the communication port 43 at such a position, the flow path for the first fluid, which is opposite to the flow direction of the first fluid on the inner peripheral surface side of the guide member 40, will be longer. Therefore, during the suppression of heat recover, it will be more difficult for the first fluid to flow to the space between the second cylindrical member 30 and the guide member 40, thereby enabling the heat insulation performance to be improved.

A method of fixing the guide member 40 is not particularly limited, and is the same as the method of fixing the first cylindrical member 20 as described above.

A material of the guide member 40 is not particularly limited, and is the same as the material of the first cylindrical member 20 as described above.

A thickness of the guide member 40 is not particularly limited, and is the same as the thickness of the first cylindrical member 20 as described above.

<Upstream Cylindrical Member 50>

The upstream cylindrical member 50 is a cylindrical member that connects the upstream end 21a of the first cylindrical member 20 and the upstream side of the guide member 40.

It is preferable that an axial direction of the upstream cylindrical member 50 coincides with that of the pillar shaped honeycomb structure 10, and a central axis of the upstream cylindrical member 50 coincides with that of the pillar shaped honeycomb structure 10.

The upstream cylindrical member 50 preferably has a flange portion 52. The flange portion 52 will provide easy connection of the upstream end 21a of the first cylindrical member 20 to the upstream side of the guide member 40.

A material of the upstream cylindrical member 50 is not particularly limited, and is the same as the material of the first cylindrical member 20 as described above.

A thickness of the upstream cylindrical member 50 is not particularly limited, and is the same as the thickness of the first cylindrical member 20 as described above.

<Downstream Cylindrical Member 60>

The downstream cylindrical member 60 is connected to the downstream end 21b of the first cylindrical member 20. The connection may be direct or indirect. In the case of indirect connection, for example, a downstream end 71b of an outer cylindrical member 70 which will be described later may be arranged between the downstream cylindrical member 60 and the downstream end 21b of the first cylindrical member 20.

The downstream cylindrical member 60 is a cylindrical member having an upstream end 61a and a downstream end 61b.

It is preferable that an axial direction of the downstream cylindrical member 60 coincides with that of the pillar shaped honeycomb structure 10, and a central axis of the downstream cylindrical member 60 coincides with that of the pillar shaped honeycomb structure 10.

Diameters (outer diameter and inner diameter) of the downstream cylindrical member 60 may be uniform in the axial direction, but at least a part of the diameters may be decreased or increased.

A material of the downstream cylindrical member 60 is not particularly limited and is the same as the material of the first cylindrical member 20 as described above.

A thickness of the downstream cylindrical member 60 is not particularly limited, and is the same as the thickness of the first cylindrical member 20 as described above.

<Outer Cylinder Member 70>

The outer cylindrical member 70 is arranged on a radially outer side of the first cylindrical member 20 with a distance so as to form a flow path for a second fluid.

The outer cylindrical member 70 is a cylindrical member having an upstream end 71a and a downstream end 71b.

It is preferable that an axial direction of the outer cylinder member 70 coincides with that of the pillar shaped honeycomb structure 10, and a central axis of the outer cylinder member 70 coincides with that of the pillar shaped honeycomb structure 10.

The outer cylindrical member 70 is preferably connected to both a feed pipe 72 for feeding the second fluid to a region between the outer cylindrical member 70 and the first cylindrical member 20, and a discharge pipe 73 for discharging the second fluid to a region between the outer cylindrical member 70 and the first cylindrical member 20. The feed pipe 72 and the discharge pipe 73 are preferably provided at positions corresponding to both axial ends of the pillar shaped honeycomb structure 10, respectively.

The feed pipe 72 and the discharge pipe 73 may extend in the same direction, or may extend in different directions.

The outer cylindrical member 70 is preferably arranged such that inner peripheral surfaces of the upstream end 71a and the downstream end 71b are in direct or indirect contact with the outer peripheral surface of the first cylindrical member 20.

A method of fixing the inner peripheral surfaces of the upstream end 71a and the downstream end 71b to the outer peripheral surface of the first cylindrical member 20 that can be used includes, but not limited to, fitting such as clearance fitting, interference fitting and shrinkage fitting, as well as brazing, welding, diffusion bonding, and the like.

Diameters (outer diameter and inner diameter) of the outer cylindrical member 70 may be uniform in the axial direction, but the diameter of at least a part (for example, a central portion in the axial direction, both ends in the axial direction, or the like) of the outer cylindrical member 70 may be decreased or increased. For example, by decreasing the diameter of the central portion in the axial direction of the outer cylindrical member 70, the second fluid can spread throughout the outer peripheral direction of the first cylindrical member 20 in the outer cylindrical member 70 on the feed pipe 72 and discharge pipe 73 sides. Therefore, an amount of the second fluid that does not contribute to the heat exchange at the central portion in the axial direction is reduced, so that the heat exchange efficiency can be improved.

A material of the outer cylindrical member 70 is not particularly limited, and is the same as that of the first cylindrical member 20 as described above.

A thickness of the outer cylindrical member 70 is not particularly limited and is the same as that of the first cylindrical member 20 as described above.

<On-off Valve 80>

An on-off valve 80 is arranged on the downstream end 31b of the second cylindrical member 30 or the downstream end 41b of the guide member 40.

The on-off valve 80 is configured to be able to adjust the flow of the first fluid inside the second cylindrical member 30 and/or the guide member 40 during heat exchange (during heat recovery). Further, the on-off valve 80 is configured to be able to release the flow of the first fluid on the inner peripheral surface side of the second cylindrical member 30 and/or the guide member 40 during non-heat exchange (during suppression of heat recovery). That is, the on-off valve 80 can allow the first fluid to flow through the pillar shaped honeycomb structure 10 by closing the on-off valve 80 during the heat recovery, and can suppress the flow of the first fluid through the pillar shaped honeycomb structure 10 by opening the on-off valve 80, thereby allowing the first fluid to flow through the downstream cylindrical member 60 via the second cylindrical member 30 or the guide member 40.

The shape and structure of the on-off valve 80 are not particularly limited, and they may be selected depending on the shape of the second cylindrical member 30 or the guide member 40 in which the on-off valve 50 is provided, and the like.

<Relationship between Cross-Sectional Area of Guide Member 40 in Forming Region for Communication Port 43 in Direction Perpendicular to Axial Direction and Cross-Sectional Area of Downstream End 61b of Downstream Cylindrical Member 60 in Direction Perpendicular to Axial Direction>

It is preferable that the cross-sectional area of the guide member 40 in a forming region for the communication port 43 in the direction perpendicular to the axial direction (the position A as shown in FIGS. 1 and 3) is substantially the same as the cross-sectional area of the downstream end 61b of the downstream cylindrical member 60 in the direction perpendicular to the axial direction (the position B as shown in FIGS. 1 and 3). With such a configuration, a pressure in the forming region for the communication port 43 will be substantially the same as a pressure in the downstream end 61b of the downstream cylindrical member 60. Therefore, during the heat recovery, it is possible to prevent the first fluid that has passed through the on-off valve 80 from flowing backward from the downstream side to the pillar shaped honeycomb structure 10 to improve the heat insulation performance.

As used herein, the "forming region for the communication port 43" means a region where the communication port 43 is formed. For example, when the communication port 43 is provided between the tip of the inclined portion 42 of the guide member 40 and the second cylindrical member 30, it means a region between the tip of the inclined portion 42 of the guide member 40 and the second cylindrical member 30. When the communication port 43 is provided at the inclined portion 42 of the guide member 40, it means a region of the inclined portion 42 where the communication port 43 (through hole 44) is formed.

Further, as used herein, the cross-sectional area of the guide member 40 in the "forming region for the communication port 43" in the direction perpendicular to the axial direction means a cross-sectional area of the tip of the inclined portion 42 of the guide member 40 in the direction perpendicular to the axial direction when the communication port 43 is provided between the tip of the inclined portion 42 of the guide member 40 and the second cylindrical member 30. Further, when the communication port 43 is provided at the inclined portion 42 of the guide member 40, it means a cross-sectional area in the direction perpendicular to the axial direction of a central portion of a region of the inclined portion 42 where the communication port 43 (through hole 44) is formed.

The relationship (a ratio $R_A$) between the cross-sectional area of the guide member 40 in the forming region for the communication port 43 in the direction perpendicular to the axial direction and the cross-sectional area of the downstream end 61b of the downstream cylindrical member 60 in the direction perpendicular to the axial direction can be represented by the following equation (1):

$$R_A = |A_1 - A_2|/A_2 \times 100 \quad (1)$$

In the equation (1), $A_1$ is the cross-sectional area of the downstream end 61b of the downstream cylindrical member 60 in the direction perpendicular to the axial direction, and $A_2$ is the cross-sectional area of the guide member 40 in the forming region for the communication port 43 in the direction perpendicular to the axial direction.

$R_A$ represented by the equation (1) is preferably 75% or less, and more preferably 50% or less. By controlling $R_A$ to such a range, during suppression of heat recovery, it is possible to prevent the first fluid that has passed through the on-off valve 80 from flowing backward to the pillar shaped honeycomb structure 10 from the downstream side to improve the heat insulation performance.

<Relationship between Size of Communication Port 43 and Size of Flow Path for First Fluid on More Downstream Side than Outflow End Face 13b of Pillar Shaped Honeycomb Structure 10>

It is preferable that the cross-sectional area of the flow path end portion between the first cylindrical member 20 and the second cylindrical member 30 in the direction perpendicular to the axial direction (the position C as shown in FIGS. 1 and 3) is substantially the same as an opening area of the communication port 43 (the position D as shown in FIGS. 1 and 3). With such a configuration, a pressure at the opening of the communication port 43 will be substantially the same as a pressure at the flow path end portion between the first cylindrical member 20 and the second cylindrical member 30. Therefore, during the suppression of heat recovery, the first fluid passing through the on-off valve 80 can be prevented from flowing back to the pillar shaped honeycomb structure 10 from the downstream side, thereby improving the heat insulation performance.

As used herein, the "opening area of the communication port 43" means a cross-sectional area of a portion formed between the tip of the inclined portion 42 (the tip of the outer peripheral surface) of the guide member 40 and the second cylindrical member 30 in the direction perpendicular to the axial direction, when the communication port 43 is provided between the tip of the inclined portion 42 of the guide member 40 and the second cylindrical member 30. When the communication port 43 is provided at the inclined portion 42 of the guide member 40, it means the opening area of the communication port 43 (through hole 44) on the outer peripheral surface of the inclined portion 42.

Further, the relationship (a ratio $R_B$) between the size of the communication port 43 and the size of the flow path for the first fluid on the more downstream side than the outflow end face 13b of the pillar shaped honeycomb structure 10 can be expressed by the following equation (2):

$$R_B = |A_3 - A_4|/A_4 \times 100 \quad (2)$$

In the equation (2), $A_3$ is a cross-sectional area of the flow path end portion between the first cylindrical member 20 and the second cylindrical member 30 in the direction perpendicular to the axial direction or a smaller value among values calculated by $\pi \times E \times F$; $A_4$ is an opening area of the communication port 43; when the communication port 43 is provided between the tip of the inclined portion 42 of the guide member 40 and the second cylindrical member 30, E is a distance between the downstream end 31b of the second cylindrical member 30 and the downstream cylindrical member 60 in the direction parallel to the axial direction, and F is an inner diameter at the downstream end 31b of the second cylindrical member 30 (see FIG. 1); when the communication port 43 is provided at the inclined portion 42 of the guide member 40, E is a distance between the downstream end 41b of the guide member 40 and the downstream cylindrical member 60 in the direction parallel to the axial direction, and F is an inner diameter at the downstream end 41b of the guide member 40 (see FIG. 3).

$R_B$ represented by the equation (2) is preferably 700% or less, and more preferably 100% or less. By controlling $R_B$ to such a range, the first fluid that has passed through the on-off valve 80 can be prevented from flowing back to the pillar shaped honeycomb structure 10 from the downstream side to improve the heat insulation performance, during the suppression of heat recovery.

<First Fluid and Second Fluid>

The first fluid and the second fluid used in the heat exchanger 100 are not particularly limited, and various liquids and gases can be used. For example, when the heat exchanger 100 is mounted on a motor vehicle, an exhaust gas can be used as the first fluid, and water or antifreeze (LLC defined by JIS K2234: 2006) can be used as the second fluid. Further, the first fluid can be a fluid having a temperature higher than that of the second fluid.

<Method for Producing Heat Exchanger 100>

The heat exchanger 100 can be produced in accordance with a known method. For example, the heat exchanger 100 can be produced in accordance with the method as described below.

First, a green body containing ceramic powder is extruded into a desired shape to prepare a honeycomb formed body. At this time, the shape and density of the cells 14, and lengths and thicknesses of the partition walls 15, the inner peripheral wall 11 and the outer peripheral wall 12, and the like, can be controlled by selecting dies and jigs in appropriate forms. The material of the honeycomb formed body that can be used includes the ceramics as described above. For example, when producing a honeycomb formed body containing the Si-impregnated SiC composite as a main component, a binder and water or an organic solvent are added to a predetermined amount of SiC powder, and the resulting mixture is kneaded to form a green body, which can be then formed into a honeycomb formed body having a desired shape. The resulting honeycomb formed body can be then dried, and the honeycomb formed body can be impregnated with metallic Si and fired under reduced pressure in an inert gas or vacuum to obtain a hollow pillar shaped honeycomb structure 10 having cells 14 defined by partition walls 15.

The hollow pillar shaped honeycomb structure 10 is then inserted into the first cylindrical member 20, and the first cylindrical member 20 is fitted to the surface of the outer peripheral wall 12 of the hollow pillar shaped honeycomb structure 10. Subsequently, the second cylindrical member 30 is inserted into the hollow region of the hollow pillar shaped honeycomb structure 10 and the second cylindrical member 30 is fitted to the surface of the inner peripheral wall 11 of the hollow pillar shaped honeycomb structure 10. The outer cylindrical member 70 is then arranged on and fixed to the radially outer side of the first cylindrical member 20. The feed pipe 72 and the discharge pipe 73 may be previously fixed to the outer cylindrical member 70, but they may be fixed to the outer cylindrical member 70 at an appropriate stage. Next, the guide member 40 is arranged on the radially inner side of the second cylindrical member 30, and the upstream end 21a of the first cylindrical member 20 and the upstream side of the guide member 40 is connected to each other by the upstream cylindrical member 50. The on-off valve 80 is then attached to the downstream end 31b of the second cylindrical member 30 or the downstream end 41b of the guide member 40. The downstream cylindrical member 60 is then disposed at the downstream end 21b of the first cylindrical member 20.

Further, the arranging and fixing (fitting) orders of the respective members are not limited to the above orders, and they may be changed as needed within a range in which the members can be produced. As the fixing (fitting) method, the above method may be used.

Since the heat exchanger 100 according to Embodiment 1 of the present invention can suppress the separation of the flow of the first fluid around the communication port 43 during the suppression of heat recovery, the difference between the pressure around the communication port 43 and the pressure in the region after passing through the on-off valve 80 will be decreased. Therefore, it is possible to suppress the backflow of the first fluid to improve the heat insulation performance.

EXAMPLES

Hereinafter, the present invention will be more specifically described with reference to Examples, but the present invention is not limited to these Examples.

<Production of Hollow Pillar Shaped Honeycomb Structure>

A green body containing SiC powder was extrusion-molded into a desired shape, and then dried, processed to have predetermined external dimensions, and impregnated with Si and fired to produce a hollow pillar shaped honeycomb structure. The hollow pillar shaped honeycomb structure had set dimensions: an outer diameter of 75 mm, a diameter of the hollow region of 57 mm, a length in the flow path direction of the first fluid of 33 mm, a thickness of each partition wall of 0.3 mm, a thickness of the inner peripheral wall of 1.5 mm, and a thickness of the outer peripheral wall of 1.5 mm. The hollow pillar shaped honeycomb structure had settings: a porosity of 1% for the partition walls, the inner peripheral wall and the outer peripheral wall, a cell density of 300 cells/cm$^2$, an isostatic strength of 150 MPa, and a thermal conductivity at 25° C. of 150 W/(m·K).

<Production of Heat Exchanger>

Example 1

Using the hollow pillar shaped honeycomb structure produced as described above, the heat exchanger 100 having the structure as shown in FIGS. 1 and 2 was produced by the method as described above. The respective members of the heat exchanger 100 were made of stainless steel, and their thicknesses were from 1 to 1.5 mm. Further, the ratio of the cross-sectional area between the second cylindrical member 30 and the guide member 40 to the cross-sectional area at the upstream end 51a in the direction perpendicular to the axial direction of the upstream cylindrical member 50 was 0.3. In this heat exchanger 100, $R_A$ was set to 50% and $R_B$ was set to 40%.

Comparative Example 1

Figure 5:
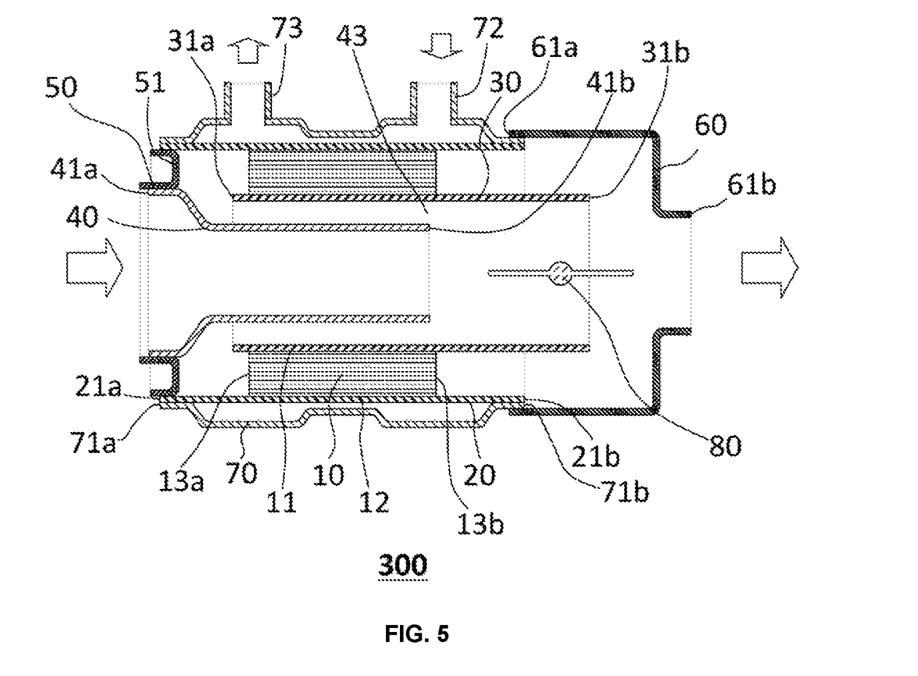
FIG. 5 is a cross-sectional view of the other heat exchanger produced in Comparative Example 1, which is parallel to a flow direction of a first fluid.

Using the hollow pillar shaped honeycomb structure produced as described above, a heat exchanger 300 having the structure as shown in FIG. 5 (which had the same structure as that of the heat exchanger 100 according to Example 1, with the exception that the guide member 40 having no inclined portion 42 that inclined toward the downstream side was used) was produced according to the method as described above. In this heat exchanger, $R_A$ was set to 55% and $R_B$ was set to 160%.

For each of the heat exchangers 100 and 300 obtained in the above Example and Comparative Example, a quantity of recovered heat and a flow rate of a backflow gas during the suppression of heat recovery was evaluated by simulation. The quantity of recovered heat and the flow rate of the backflow gas were evaluated as follows.

(Quantity of Recovered Heat)

To the heat exchangers 100 and 300 obtained in the above Example and Comparative Example, air (the first fluid) at 800° C. (Tg1) was fed at a flow rate of 90 g/sec (Mg) in the state where the on-off valve 80 was opened, and water (second fluid) was fed from the feed pipe 72 at a flow rate of 166 g/sec (Mw), and the water was recovered from the discharge pipe 73. Under each of the above conditions, the feeding of air and water to the heat exchangers 100 and 300 was started. After reaching a steady state, a temperature of water in the feed pipe 72 (Tw1) and a temperature of water in the discharge pipe 73 (Tw2) were measured, and a heat quantity Q recovered by water was determined. The recovered heat quantity Q is expressed by the following equation:

$$Q(kW)=\Delta Tw \times Cpw \times Mw, \text{ with: } \Delta Tw=Tw2-Tw1, \text{ and}$$
$$Cpw \text{ (specific heat of water)}=4182 \text{ J/(kg·K)}.$$

(Flow Rate of Backflow Gas)

The flow rate and density of the gas (the first fluid) was determined at a position between the first cylindrical member 20 and the second cylindrical member 30 in the downstream end 21b of the first cylindrical member 20, and the product of them was integrated to determine the flow rate of the backflow gas.

The evaluation results are shown in Table 1.

TABLE 1

|  | Example 1 | Comparative Example 1 |
| --- | --- | --- |
| Recovered Heat Quantity (kW) | 2.00 | 5.00 |
| Flow Rate of Backflow Gas (g/s) | 0.10 | 1.40 |

As shown in Table 1, the heat exchanger 100 according to Example 1 had the recovered heat quantity and the flow rate of the backflow gas lower than those of the heat exchanger 300 according to Comparative Example 1.

As can be seen from the above results, according to the present invention, it is possible to provide a heat exchanger capable of suppressing the backflow of the first fluid during suppression of heat recovery to improve the heat insulation performance.

DESCRIPTION OF REFERENCE NUMERALS 110 pillar shaped honeycomb structure
11 inner peripheral wall
12 outer peripheral wall
13a inflow end face
13b outflow end face
14 cell
15 partition wall
20 first cylindrical member
21a upstream end
21b downstream end 30 second cylindrical member
31a upstream end
31b downstream end
40 guide member
41a upstream end
41b downstream end
42 inclined portion
43 communication port
44 through hole
50 upstream cylindrical member
51 upstream end
52 flange
60 downstream cylindrical material
61a upstream end
61b downstream end
70 outer cylindrical member
71a upstream end
71b downstream end
72 feed pipe
73 discharge pipe
80 on-off valve
100, 200, 300 heat exchanger

The invention claimed is:

1. A heat exchanger, comprising:
a hollow pillar shaped honeycomb structure having an inner peripheral wall, an outer peripheral wall and partition walls each disposed between the inner peripheral wall and the outer peripheral wall, the partition walls defining a plurality of cells to form flow paths for a first fluid, each of the cells extending from an inflow end face to an outflow end face;
a first cylindrical member fitted to a surface of the outer peripheral wall of the pillar shaped honeycomb structure;
a second cylindrical member fitted to a surface of the inner peripheral wall of the pillar shaped honeycomb structure;
a cylindrical guide member having a portion, the portion being disposed on a radially inner side of the second cylindrical member with a distance so as to form the flow path for the first fluid;
an upstream cylindrical member connecting an upstream end of the first cylindrical member to an upstream side of the guide member; and
a downstream cylindrical member connected to a downstream end of the first cylindrical member,
wherein the guide member comprises an inclined portion that inclines to its downstream side; and
wherein a communication port for directing the first fluid flowing on an inner peripheral side of the guide member to a space between an inner peripheral side of the second cylindrical member and an outer peripheral side of the guide member is provided between a tip of the inclined portion of the guide member and the second cylindrical member or at the inclined portion of the guide member.

2. The heat exchanger according to claim 1, wherein a cross-sectional area of the guide member in a forming region for the communication port in a direction perpendicular to an axial direction is substantially the same as a cross-sectional area of a downstream end of the downstream cylindrical member in the direction perpendicular to the axial direction.

3. The heat exchanger according to claim 1, wherein a ratio $R_A$ represented by the following equation (1) is 75% or less:

$$R_A = |A_1 - A_2|/A_2 \times 100 \tag{1}$$

in which $A_1$ is a cross-sectional area of the downstream end of the downstream cylindrical member in the direction perpendicular to the axial direction, and $A_2$ is a cross-sectional area of the guide member in the forming region for the communication port in the direction perpendicular to the axial direction.

4. The heat exchanger according to claim 1, wherein a ratio $R_B$ represented by the following equation (2) is 700% or less:

$$R_B = |A_3 - A_4|/A_4 \times 100 \tag{2}$$

in which $A_3$ is a cross-sectional area of a flow path end portion between the first cylindrical member and the second cylindrical member in the direction perpendicular to the axial direction or a smaller value among values calculated by $\pi \times E \times F$;
$A_4$ is an opening area of the communication port;
when the communication port is provided between the tip of the inclined portion of the guide member and the second cylindrical member, E is a distance between the downstream end of the second cylindrical member and the downstream cylindrical member in the direction parallel to the axial direction, and F is an inner diameter at the downstream end of the second cylindrical member;
when the communication port is provided at the inclined portion of the guide member, E is a distance between the downstream end of the guide member and the downstream cylindrical member in the direction parallel to the axial direction, and F is an inner diameter at the downstream end of the guide member.

5. The heat exchanger according to claim 1, further comprising an outer cylindrical member arranged on a radially outer side of the first cylindrical member with a distance so as to form a flow path for a second fluid.

6. The heat exchanger according to claim 1, further comprising an on-off valve arranged on the downstream end of the second cylindrical member or the guide member.

7. The heat exchanger according to claim 6, wherein the on-off valve is configured to be able to adjust the flow of the first fluid inside the second cylindrical member and/or the guide member during heat exchange.

* * * * *